A. SUNDH.
GATE POST STRUCTURE.
APPLICATION FILED FEB. 18, 1916.

1,237,837.

Patented Aug. 21, 1917.

INVENTOR
August Sundh
BY
J. F. Rule,
ATTORNEY

UNITED STATES PATENT OFFICE.

AUGUST SUNDH, OF HASTINGS-UPON-HUDSON, NEW YORK.

GATE-POST STRUCTURE.

1,237,837. Specification of Letters Patent. Patented Aug. 21, 1917.

Application filed February 18, 1916. Serial No. 79,042.

*To all whom it may concern:*

Be it known that I, AUGUST SUNDH, a citizen of the United States, and resident of Hastings-upon-Hudson, in the county of Westchester and State of New York, have invented a certain new and useful Gate-Post Structure, of which the following is a specification.

My invention relates to gate posts or structures for supporting gates and the like and more particularly, is directed to means for uniting and bracing the posts between which a gate is hung. Much trouble has been experienced with gate posts becoming loosened or pulled out of plumb so that a gate hung on one of the posts does not close properly, the gate latch fails to register with its keeper, and it becomes difficult or impossible to close and latch the gate. A gate post even though firmly set in the ground when new will in a comparatively short time work loose or be pulled out of vertical adjustment owing to the strain placed thereon by various agencies, as for example, the strain thereon by the attached fence due to its weight, expansion and contraction under variations of temperature, etc.

The present invention aims to overcome the above objections and difficulties by providing suitable means located below the surface of the ground for connecting and bracing the gate posts between which a gate is hung. Such connecting means may comprise a horizontal brace rod or rods rigidly connected to each post beneath the surface of the ground. In one form of the invention, there may be provided, in addition to the posts between which the gate is hung, auxiliary posts close to the gate posts for the attachment of the adjoining fence, whereby the said auxiliary posts receive the strain due to the expansion and contraction of the fence structure, thus relieving the main gate posts entirely of such strain.

Other features and advantages will appear hereinafter.

Figure 1:
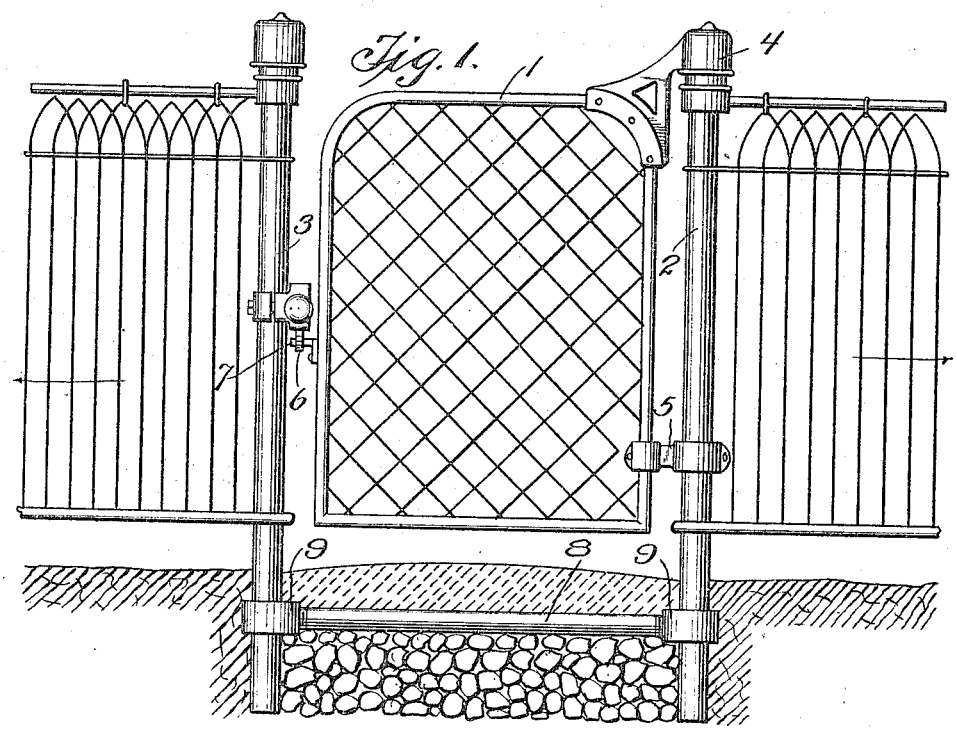
Figure 2:
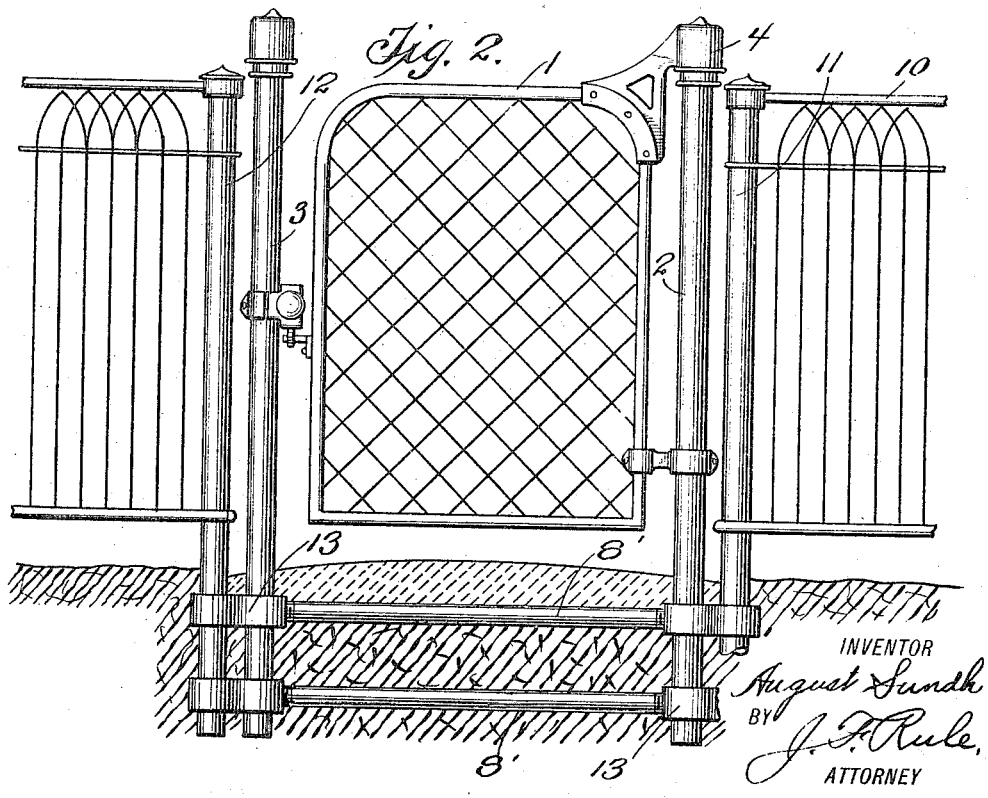

In the accompanying drawings, Figure 1 is a view showing a pair of gate posts and appurtenances. Fig. 2 is a view of a different form of the invention.

Referring particularly to Fig. 1, a gate 1, is hung between the gate posts 2 and 3, being hung from the post 2 by an upper hinge 4 and a lower hinge 5. The hinge 4 may be of the gravity operated type so that the gate is self closing. The construction of said hinge may be the same as that disclosed in my co-pending application Serial No. 1528, filed January 11, 1915. A gate latch 6 mounted on the post 3, automatically engages a keeper 7 on the gate as the latter swings by gravity to a closed position.

The two gate posts may be rigidly united and braced by a horizontal brace rod 8, preferably located a short distance beneath the surface of the ground and which may have a screw threaded connection with the sleeves or connecting members 9 surrounding and fixed to or snugly fitting the posts. It will be seen that with this arrangement each post is firmly braced and securely held against working loose. This is of importance as when either gate post is thrown out of vertical adjustment even a slight amount, the gate does not swing true and the latch fails to properly engage its keeper. This is particularly true with automatically operated gates of the gravity type which also fail to swing to a closed position when the post on which the gate is hung is out of adjustment.

It will be noted that the construction shown obviates the need of unsightly diagonal braces or other means above the ground for bracing the posts. This feature is especially desirable in connection with ornamental fences for gardens, etc.

Fig. 2, shows a modified form of the invention wherein auxiliary fence posts 11 and 12 are placed close to the gate posts 2 and 3, for the attachment thereto of the fence 10. Brace rods 8' may connect the posts 2 and 3, being united thereto by the connecting members 13, the latter being rigidly secured both to the gate posts and to the adjoining fence posts. With this arrangement, the gate posts 2 and 3 are entirely relieved of any strain which would otherwise be placed thereon by the fence if the latter were attached directly to the gate posts. Owing to the expansion and contraction of the fence due to variations in temperature, it is important that the structure permit a certain amount of yielding of the attached posts. In the construction shown in Fig. 2, the posts 11 and 12 permit such contraction and expansion while at the same time there is the absolutely rigid connection of the gate posts provided by the use of the two spaced brace rods 8'.

Variations other than those herein shown may be resorted to without departing from the spirit or scope of the invention.

What I claim is,—

1. The combination of gate posts, a gate hung therebetween, fence posts in close proximity to the gate posts, and a brace rod below the surface of the ground extending between the gate posts and rigidly uniting all of said posts.

2. The combination of gate posts, a gate hung therebetween, fence posts in close proximity to the gate posts, and parallel spaced brace rods extending between the gate posts and each rigidly uniting all of said posts.

3. The combination of gate posts, a gate hung therebetween, fence posts in proximity to the gate posts, and a plurality of braces rigidly connecting each fence post with the adjacent gate post, one brace for each two adjacent posts being located near the surface of the ground, and the other at a substantially lower position.

Signed at New York city in the county of New York and State of New York this 14th day of February A. D. 1916.

AUGUST SUNDH.

Witnesses:
WALTER C. STRANG,
ERNEST L. GALE, Jr.

Copies of this patent may be obtained for five cents each, by addressing the "Commissioner of Patents, Washington, D. C."